UNITED STATES PATENT OFFICE.

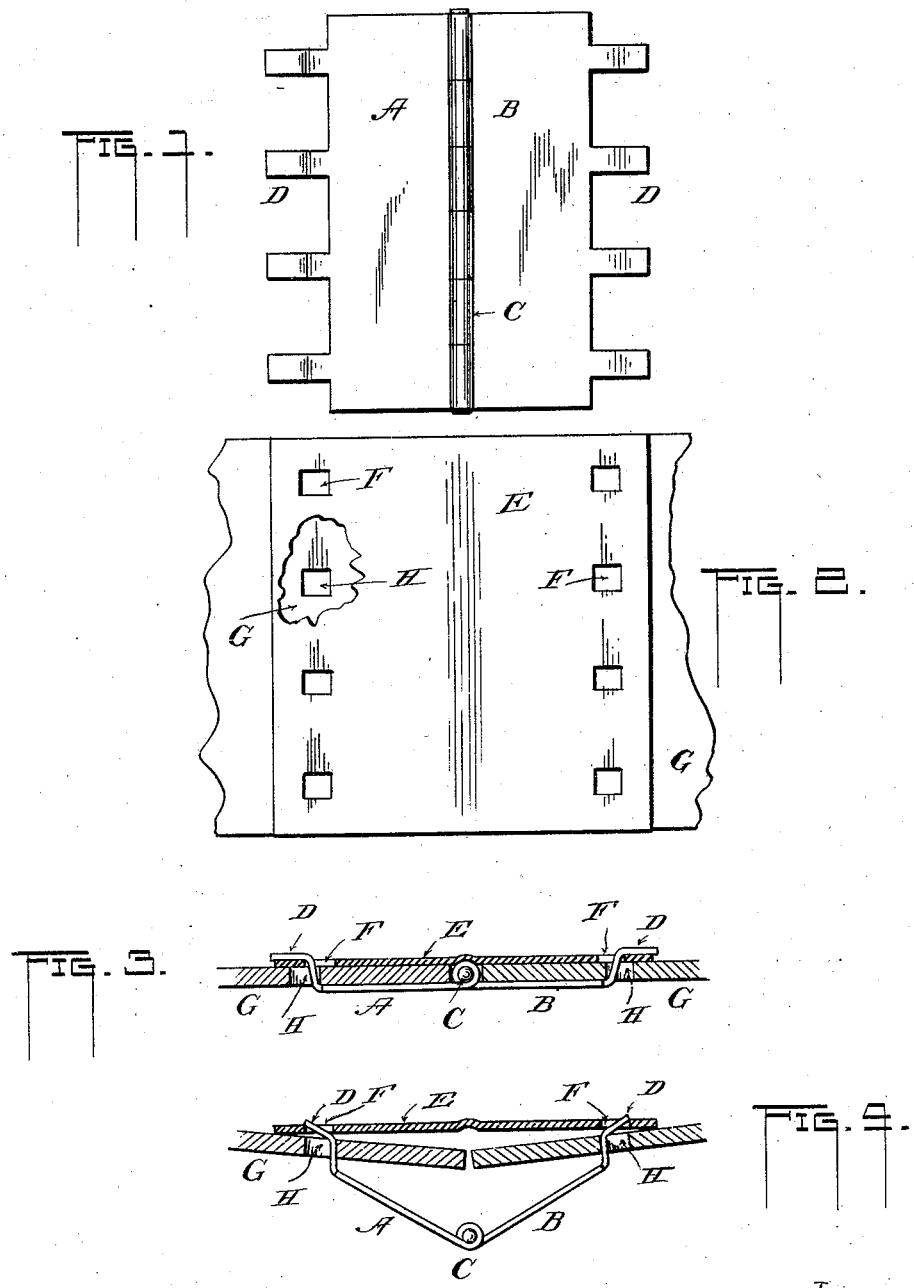

JOHN R. GOLDEN, OF SPRING LAKE, ILLINOIS.

DEVICE FOR FASTENING BELTS.

938,049.   Specification of Letters Patent.   Patented Oct. 26, 1909.

Application filed March 21, 1908. Serial No. 422,384.

*To all whom it may concern:*

Be it known that I, JOHN R. GOLDEN, citizen of the United States, residing at Spring Lake, in the county of Tazewell and State of Illinois, have invented certain new and useful Improvements in Devices for Fastening Belts; and I do hereby declare that the following is a full, clear, and exact description of the invention, which will enable others skilled in the art to which it appertains to make and use the same.

This invention relates to a belt lacing, and pertains to a device for fastening the ends of a belt and replaces the leather lacing ordinarily used for the purpose. It further pertains to a device by which the ends of a belt may be fastened and unfastened in a few moments time.

To the end that the invention may be understood I have provided the accompanying drawing in which—

Figure 1 is a plan of a portion of my invention. Fig. 2 is a plan of another portion. Fig. 3 is a vertical longitudinal section of the ends of a belt and my device in connection therewith showing one of the parts in section. Fig. 4 is a similar view with the parts in position for either engaging or releasing the belt.

Letters of reference correspond in the drawing and specification.

A and B indicate two plate sections connected after the manner of a hinge as shown at C, their edges parallel to the hinge being each provided with a series of lugs or extensions D which are turned up from the plane of the plates as shown in Figs. 3 and 4, their immediate ends lying substantially parallel to the said plane. E is a plate of substantially the same size as the completed hinged portions just described, and is provided with a series of holes F corresponding in number and position to the extensions D.

The belt is indicated in the last three figures by the reference letter G both its ends being likewise provided with holes H to correspond with the holes F of the plate.

In placing the device upon the belt the ends of the belt are brought together upon which is placed the plate E with the holes F and H registering. The hinged members A B are then partially collapsed so as to bring their extensions D opposite the holes into which they are inserted, then, by pushing the hinge C toward the belt E the extensions are carried beyond the holes and above and upon the said plate E as shown in Fig. 3, said hinge E entering between the ends of the belt out of the way.

In the position shown in the figures referred to it will be seen that the ends of the extensions now lie upon the outer edge of the plate E and thus placed the entire device and belt are prevented from becoming separated. The hinged portion A B is preferably placed on the inner side of the belt and consequently runs upon the belt wheel or pulley. The device is sufficiently narrow to pass around the pulley and can slightly bend or flex in so doing. The strain or pull of the belt will be upon the extensions D, the pull from these being upon the plate E there being a pull also upon the pin of the hinge although this will be slight as compared to that put upon the extensions by reason of the more direct pull upon the latter, but this will be understood.

In removing the device from the belt the ends of the latter are tipped at an angle with respect to one another, substantially as shown in Fig. 4, at the same time drawing the hinge C away from the plate F. This operation brings the holes F and H into register and provides for permitting the series of extensions to approach each other or to shorten the distance between them to such an extent as to permit them to readily free themselves from the plate and belt.

A device of this character provides for quickly placing the belt in use without the heretofore tedious lacing operation. When it has become necessary to shorten the belt, the ends may be separated almost instantly, the desired amount removed, new holes made in one of the ends and the device attached as before. Although I have shown the holes in the belt to be quite large or at least as large as those in the plate these may be mere slits, for instance, about half as wide as those shown so that after the extensions D have been released from the plate E the belt ends can be bent in such a way as to carry them over the bends of such extensions.

Such alterations as come within the scope of the appended claims may be made in my device as will suggest themselves from time to time without departing from the spirit and intent of the invention which, as already intimated, is to provide a device that may be quickly attached and detached while being perfectly safe and reliable.

Having thus described my invention, I claim:

1. A device of the class described consisting of a member of two pivotally connected portions, there being an extension on each of two opposite edges of the member, the same being turned upward and outward in opposite directions, and a second member having an aperture in each of two opposite edges through which the extensions of the first member are adapted to enter and with which they engage.

2. In combination with the ends of a belt having apertures therein, a member having apertures therein to correspond with those of the belt, and a second member comprising two pivoted portions having extensions thereon adapted to pass through the apertures of the belt and the member first described, and adapted for connecting the ends of the belt.

3. As an article of manufacture, a plate-member having apertures in two opposite edges thereof, a second member comprising two hinged portions whose free edges parallel to the axis of the hinges are provided with extensions permanently struck up from the plane of the portions and which project upwardly and outwardly substantially as shown for the purposes described.

In testimony whereof I affix my signature, in presence of two witnesses.

JOHN R. GOLDEN.

Witnesses:
F. H. FRANZLAN,
F. D. RANKIN.